(12) United States Patent
Rieser et al.

(10) Patent No.: US 6,739,543 B2
(45) Date of Patent: May 25, 2004

(54) DEVICE FOR WINDING A MULTIPOLE STATOR

(75) Inventors: Urs Rieser, Mellingen (CH); Beat Eugster, Boppelsen (CH); Vinzenz Wyss, Lengnau (CH)

(73) Assignee: ATS Wickel-und Montagetechnik AG, Wuerenlos (CH)

( * ) Notice: Subject to any disclaimer, the term of this patent is extended or adjusted under 35 U.S.C. 154(b) by 0 days.

(21) Appl. No.: 10/213,877

(22) Filed: Aug. 6, 2002

(65) Prior Publication Data

US 2003/0025026 A1 Feb. 6, 2003

(30) Foreign Application Priority Data

Aug. 6, 2001 (EP) ............................................. 01810760

(51) Int. Cl.$^7$ .......................................... H02K 15/085
(52) U.S. Cl. ................. 242/432.4; 242/432.5
(58) Field of Search ............................ 242/432.4, 432.5

(56) References Cited

U.S. PATENT DOCUMENTS

| | | | | | |
|---|---|---|---|---|---|
| 4,917,316 | A | * | 4/1990 | Suzuki | 242/434.8 |
| 5,988,554 | A | * | 11/1999 | Taka | 242/433.1 |
| 6,098,912 | A | * | 8/2000 | Noji | 242/432.5 |
| 6,254,027 | B1 | * | 7/2001 | Kunou | 242/432.4 |
| 6,533,208 | B1 | * | 3/2003 | Becherucci et al. | 242/432.4 |

FOREIGN PATENT DOCUMENTS

| | | |
|---|---|---|
| DE | 35 16 763 | 11/1985 |
| EP | 0 982 837 | 3/2000 |
| EP | 1 049 237 | 11/2000 |
| JP | 2000-245121 | 9/2000 |

* cited by examiner

*Primary Examiner*—Kathy Matecki
*Assistant Examiner*—Evan Langdon
(74) *Attorney, Agent, or Firm*—Bachman & LaPointe, P.C.

(57) ABSTRACT

A device (10) for winding wire around pole horns of a rotationally symmetrical multipole stator (12) of an electrical machine has a wire guide for the supply of the wire and for performing a winding movement made up of individual movements around the pole horn and a traversing movement in the longitudinal direction of the pole horn. To perform a first traversing movement in a vertical direction (z) the wire guide is actively connected to a stroke rod (60) which is axially movable in the vertical direction (z), to perform a second traversing or rotational movement in a horizontal direction an indexing device is actively connected to the stator (12) to be wound, and to perform the traversing movement in a radial direction (x) corresponding to the longitudinal direction of the pole horn to be wound, the wire guide is connected to a winding rod (32) which is movable in the radial direction (x).

11 Claims, 7 Drawing Sheets

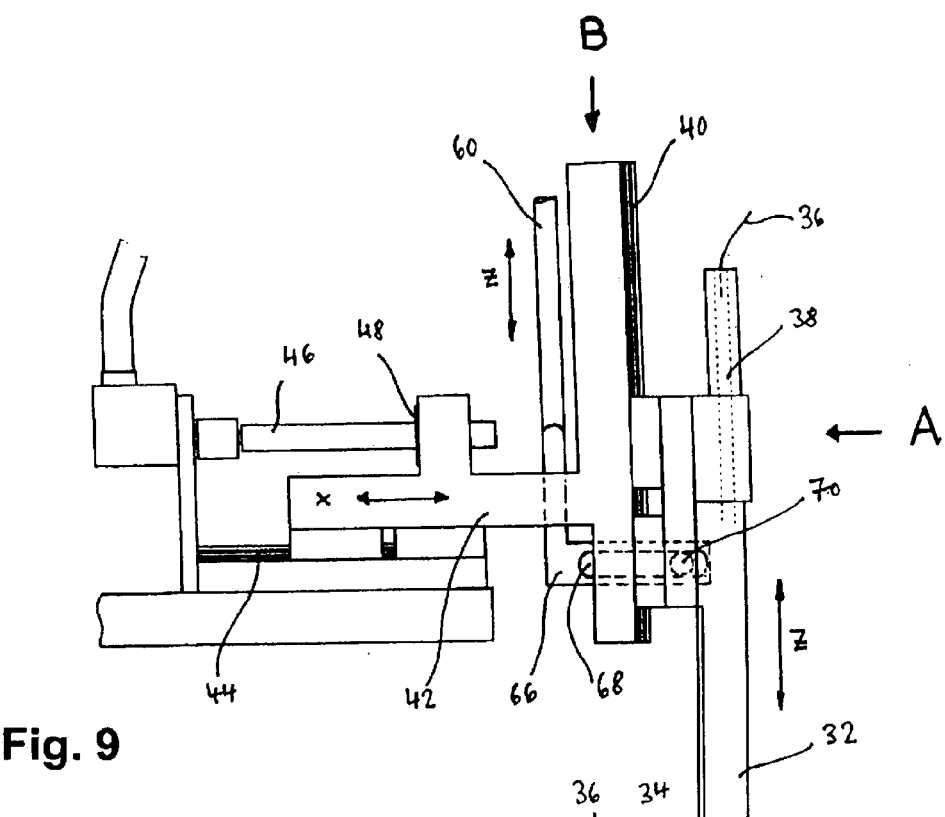
Fig. 9
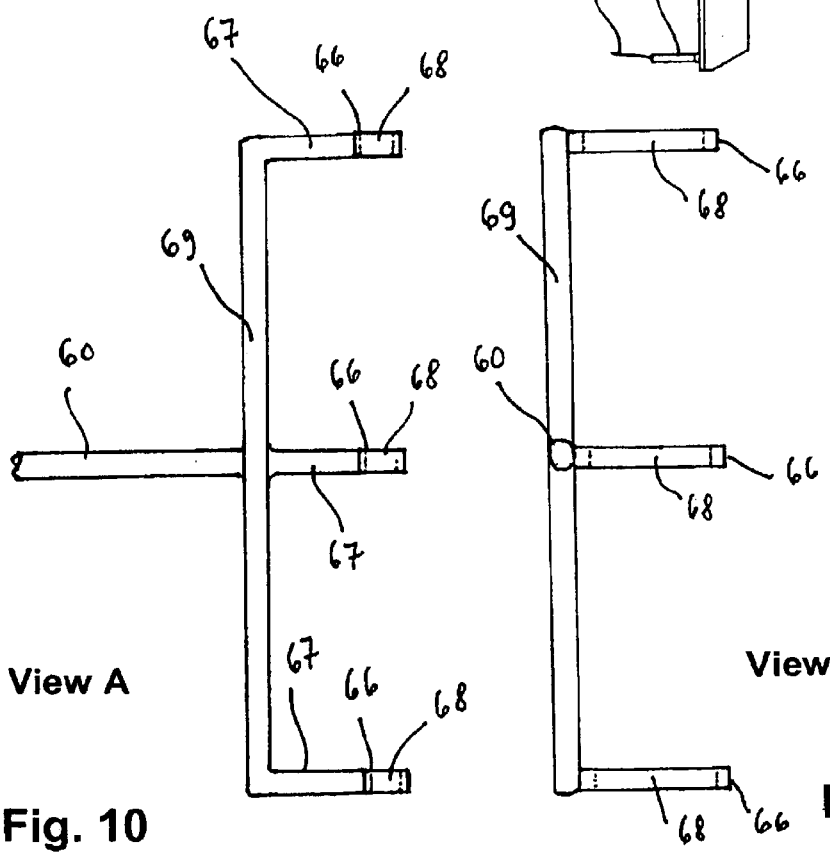
View A
Fig. 10
View B
Fig. 11

DEVICE FOR WINDING A MULTIPOLE STATOR

BACKGROUND OF THE INVENTION

The invention relates to a device for winding wire around pole horns of a rotationally symmetrical multipole stator of an electrical machine, with a wire guide for the supply of the wire and for performing a winding movement made up of individual movements around the pole horn to be wound and a traversing movement in the longitudinal direction of the pole horn.

In automotive engineering, electronic motors are increasingly replacing the commutator motors that were common in the past. A distinction is made between internal and external rotor motors, depending upon design. The laminations of the stator of an internal rotor motor approximately correspond to the laminations of an asynchronous motor. The laminations of the stator of an external rotor motor largely correspond to the armature laminations of a commutator motor.

For a stator of an internal or external rotor motor it is desirable to apply a winding that is distributed uniformly over the entire length of each pole horn, preferably in layers.

A winding device which is common today has a winding rod in the form of a hollow shaft, which has one or more wire guide nozzles fitted on the end at right angles. The winding rod is controlled such that the wire guide nozzles plus the emerging winding wire perform a stroke movement and the stator performs a swivel movement of approximately one pole pitch. As a result the wire is guided in an approximately right-angled winding track around the pole horn in question.

To prevent the winding from piling up at one point, an additional movement of the wire guide nozzles to-and-fro in the radial direction is required.

A device of the type mentioned above is disclosed in EP-A1 076 401. However, the winding device described therein is a complicated construction.

The invention relates to the task of creating a device of the type mentioned above, the design of which is as simple as possible, which can be converted in a simple manner, and which is suitable for the simultaneous winding of either several pole horns of a single stator or one pole horn each of several stators. In addition, the device should be equally suitable for the winding of stators for internal and external rotor motors.

SUMMARY OF THE INVENTION

The task according to the invention is solved in that:
- to perform a first traversing movement in a vertical direction, the wire guide is actively connected to a stroke rod which is axially movable in the vertical direction,
- to perform a second traversing or rotational movement in a horizontal direction, an indexing device is actively connected to the stator to be wound, and
- to perform the traversing movement in a radial direction corresponding to the longitudinal direction of the pole horn to be wound, the wire guide is connected to a winding rod which is movable in the radial direction.

The winding rod should preferably be movable in the radial direction by means of a radial guide, where preferably a first threaded spindle is provided to perform the traversing movement. This first threaded spindle is preferably connected to a first drive motor by means of a flexible shaft.

The winding rod is suitably fastened to an adjusting block which is movable along the radial guide, whereby the winding rod is preferably movable in the vertical direction along a vertical guide located on the adjusting block, and the first threaded spindle engages the adjusting block.

In a preferred variant of the device according to the invention a mounting piece with a slot lying in the radial direction is arranged on the stroke rod and a guide pin which is attached to the winding rod is guided in the slot.

The stroke rod is preferably connected to a second drive motor by way of a second threaded spindle.

During the winding process the indexing device is preferably connected to a clamping device for the stator to be wound.

For the simultaneous winding of several pole horns of a single stator or one pole horn each of several stators, several winding rods are arranged each with a wire guide, the stroke rod engages each of the winding rods and the winding rods can be moved synchronously by means of a first common drive motor.

For the simultaneous winding of one pole horn each of several stators the winding rods with the wire guide are preferably arranged parallel to each other and in line.

BRIEF DESCRIPTION OF THE DRAWINGS

Further advantages, features and details of the invention are given in the following description of preferred embodiment examples and also in the drawing; the drawings show diagrammatically:

FIG. 9 a side view of three in line and side by side arranged adjusting units shown in FIG. 3 with a common stroke device;

FIG. 10 a view from above of the common stroke device of the three adjusting units of FIG. 9.

FIG. 11 a front view of the stroke device of the three adjusting units of FIG. 9.

DETAILED DESCRIPTION

Figure 1:
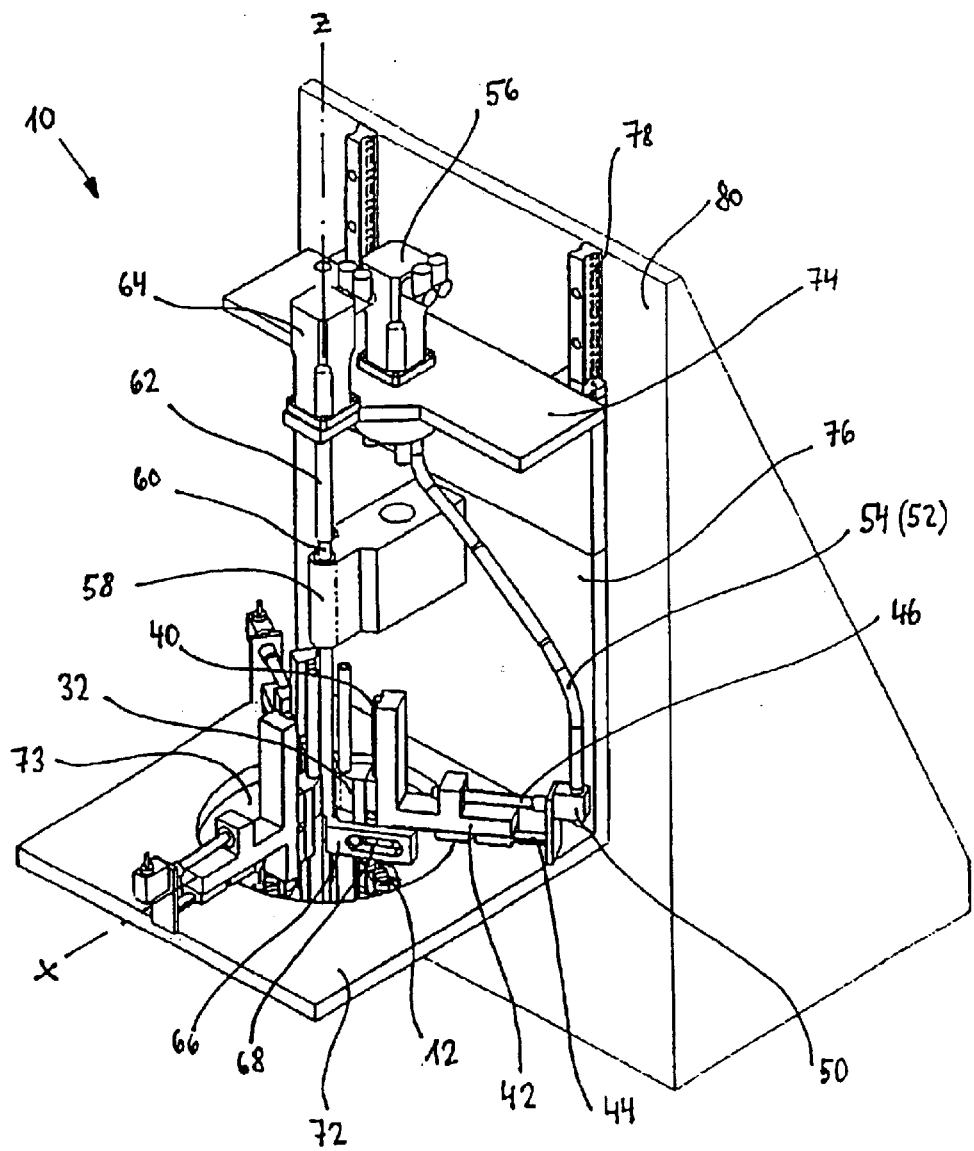
FIG. 1 a diagonal view of a winding machine.
Figure 2:
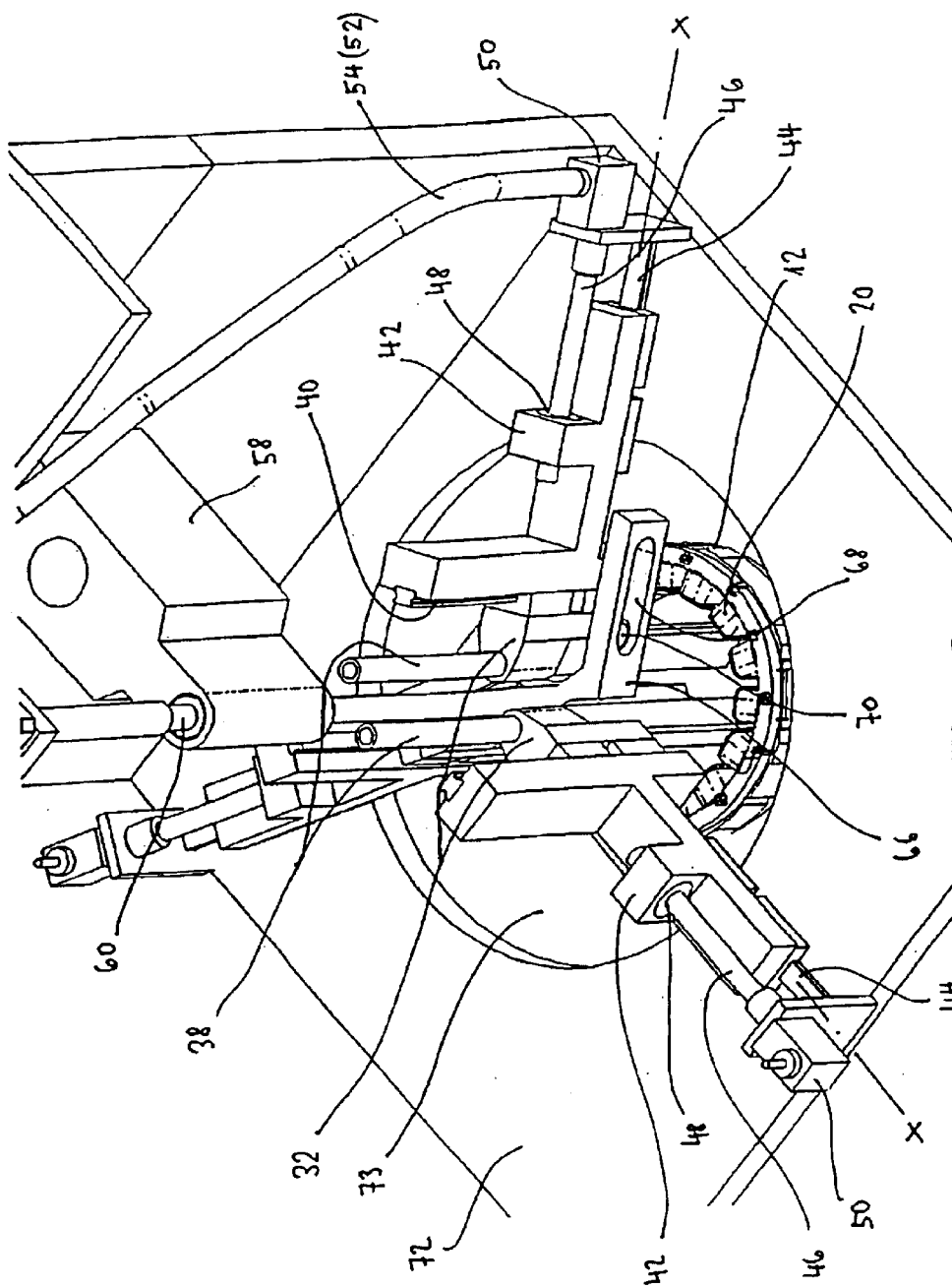
FIG. 2 a diagonal view of a detail of FIG. 1.

A winding machine 10 shown in FIGS. 1 to 8 is intended for the winding of multipole stators 12. The stator 12 shown in FIG. 6 for example consists primarily of an annular body 14 with pole horns 16 protruding radially inwards from this and separated from each other by intermediate spaces in the form of axial grooves 18. Three windings 20 have already been completed. The 15-pole stator 12 shown as an example is part of an internal rotor electronic motor. The stator 12 is produced by the stamp packing of identical laminations to form a laminated core.

Figure 5:
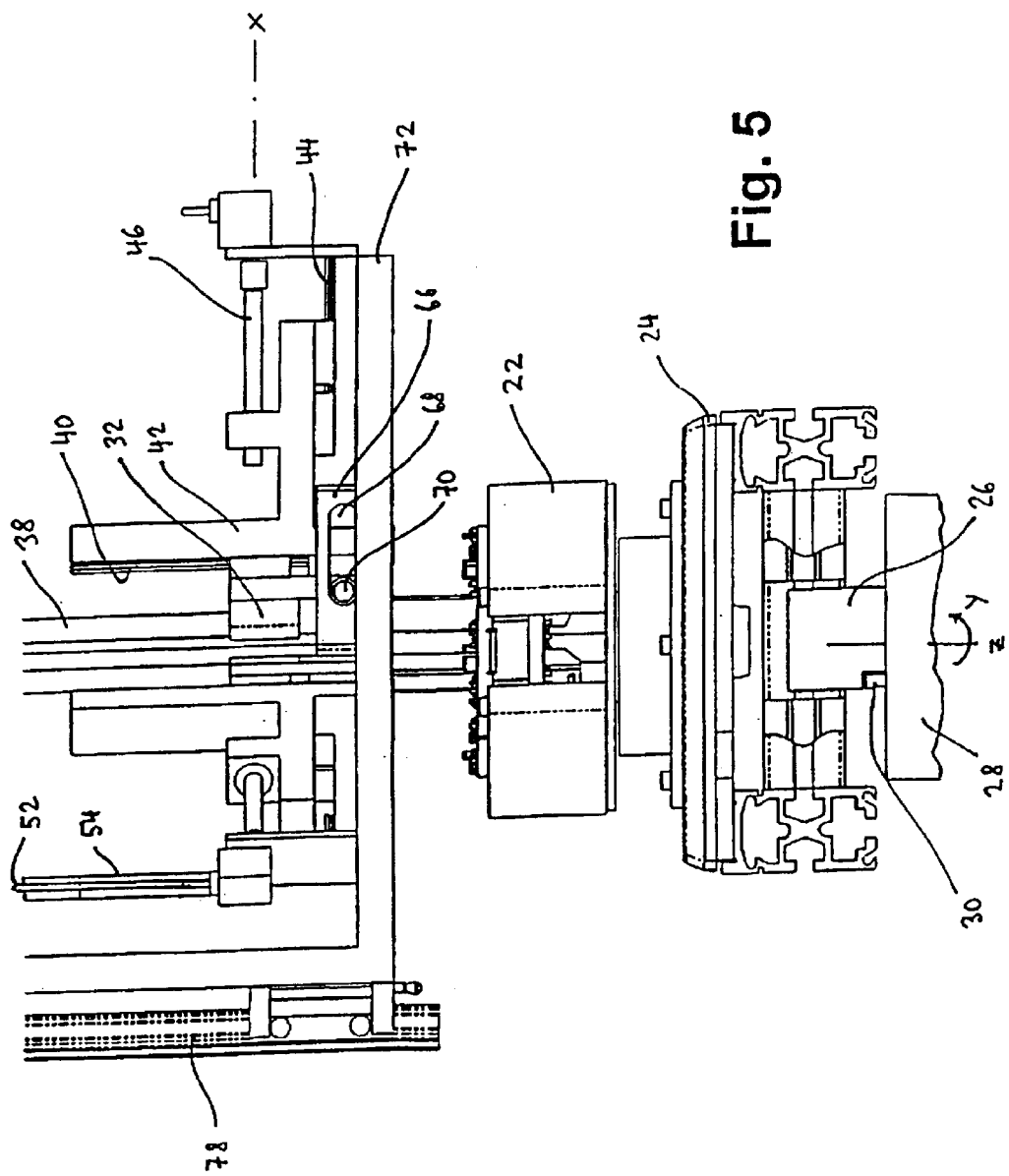
FIG. 5 a side view of a detail of FIG. 4.
Figure 6:
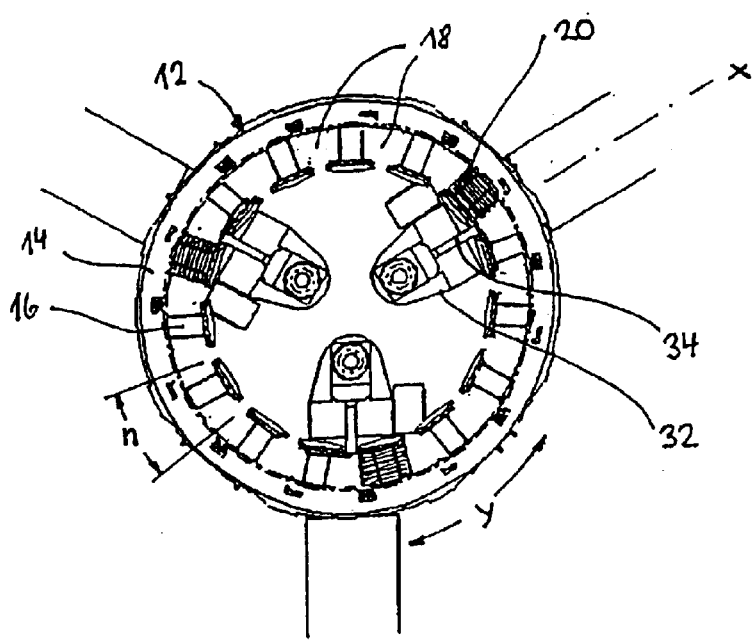
FIG. 6 a view from below of a detail of FIG. 1.

As can be seen from FIG. 5, the stator 12 is fixed in a clamping device 22 during the winding process. A shaft 26 rotatably mounted in a transport pallet 24 is rigidly connected to a clamping device 22. In the winding position the free end of the shaft 26 is connected to an indexing device 28 by way of a carrier 30. The indexing device 28 serves to perform a rotational movement of the stator 12 about its rotational axis z. The transport pallet 24 is guided to and from the winding machine 10 by way of a pallet conveyor 84 by means of conveyor belts 82.

A winding rod 32 for a wire guide nozzle 34 is slidably mounted in a vertical guide rail 40 arranged vertically, parallel to the rotational axis z of the stator 12. The wire guide nozzle 34 is fastened at the lower end of the winding rod 32 and points radially outwards in relation to the stator 12 and its rotational axis z. The upper part of the winding rod 32 is formed as a wire guide tube 38. The winding wire 36 is fed by way of the wire guide tube 38 of the wire guide nozzle 34.

The vertical guide rail 40 is part of an adjusting block 42, which can be moved on a radial fixed-position guide rail 44 in a radial traversing axis x in the direction of the vertical axis z, which corresponds to the rotational axis of the stator. The adjusting block 42 is movable on the radial guide rail 44 by means of a first threaded spindle 46 located in a thread 48 in the adjusting block 42. The first threaded spindle 46 is connected by way of a deflection gear 50 to a flexible shaft 52 located in a covering 54.

In the embodiment example shown, three of the units described above for the simultaneous winding of three pole horns 16 of a stator 12 are arranged symmetrically at an angle of 120° in relation to one another. Each of the flexible shafts 52 (only one flexible shaft is shown in the drawing) is connected to a central first drive motor 56.

A stroke rod 60 which is movable along the vertical axis z is mounted in a pillow block 58. For the performance of stroke movements in the direction of the z axis, the upper end of stroke rod 60 is formed as a second threaded spindle 62 which is connected to a second drive motor 64 to perform the stroke movements of the stroke rod 60.

Horizontally protruding mounting pieces 66 with a slot also running in the horizontal direction are located at the lower end of stroke rod 60. The slot 68 serves to hold guide pins 70 mounted on the side of the winding rod 32. By means of this arrangement of the mounting pieces 66, a stroke movement of the stroke rod 60 is simultaneously transmitted to all three winding rods 32, leading to a synchronization of the stroke movements of all wire guide nozzles 34.

The radial guide rails 44 for the adjusting blocks 42 are mounted on a first platform 72. This platform 72 has a central opening 73. The vertical guide rails 40 and the brackets 32 which slide along these protrude through the opening 73. The two drive motors 56, 64 are mounted on a second platform 74 arranged above the first platform 72. The two platforms 72, 74 are held at a distance from one another by a back wall 76 on which is arranged the pillow block 58 for the stroke rod 60. The arrangement consisting of the two platforms 72, 74 and the back wall 76 is fastened to a mounting wall 80 such that it is movable in the vertical direction by means of third guide rails 78.

Figure 7:
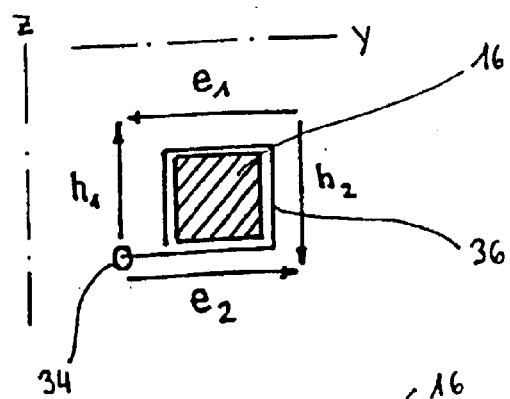
FIGS. 7, 8 the relative movements of a wire guide nozzle during a winding operation.

As shown in FIG. 7, the wire 36 is wound by an approximately rectangular movement of the wire guide nozzle 34 around the pole horn 16 to be wound. The wire guide nozzle 34 is controlled by the stroke movements of the stroke rod 60 and the indexing movements of the indexing device 28 each by a pole pitch n. The movement sequence of the wire guide nozzle 34 for applying a winding loop around the pole horn 16 is made up of the following individual sequential movements:

first stroke movement h1 vertically upwards, performed by a corresponding stroke movement of the stroke rod 60 first indexing movement e1 in the horizontal direction, performed by a corresponding indexing movement of the indexing device 28 in its direction of rotation second stroke movement h2 vertically downwards, performed by a corresponding stroke movement of the stroke rod 60 second indexing movement e2 in the opposite horizontal direction, performed by a corresponding indexing movement of the indexing device 28.

The said individual movements of the wire guide nozzle 34 in relation to the pole horns 16 to be wound are performed sequentially until the complete winding 20 has been constructed upon the pole horn 16.

Figure 8:
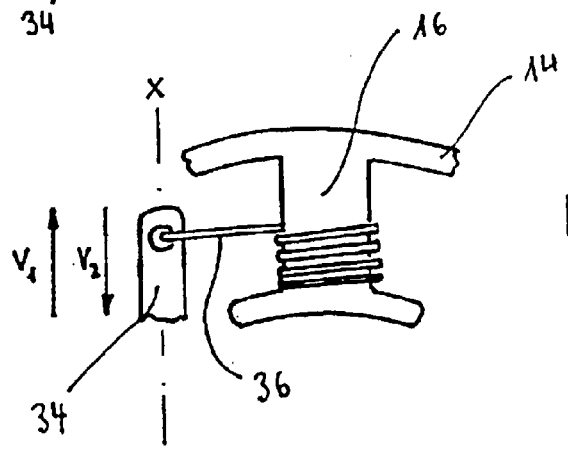

FIG. 8 shows the traversing movements of the wire guide nozzle 34 in the horizontal direction x. These traversing movements are produced by the sliding movement of the adjusting blocks 42 along the radial guide rails 44. A first traversing movement v1 is made radially outwards in relation to the rotational axis z, a second traversing movement v2 opposes the first traversing movement v1. The traversing movements v1,2 are overlaid with the stroke and indexing movements h1,2 and e1,2 performed perpendicularly thereto. Depending upon the winding speed these movements can be performed continuously to apply uniform winding layers or incrementally to build up a winding layer radially outwards (v1) and subsequently to wind the next layer radially inwards (v2).

Although the embodiment example shown in FIGS. 1 to 8 shows a winding machine for the winding of stators for internal rotor motors, consideration of the drawing will also lead to the use of the winding machine for the winding of stators for external rotor motors. The functional mode of operation of the individual machine elements remains the same, only their arrangement and orientation in relation to the stator to be wound must be altered.

For the simultaneous winding of one pole horn each of several stators, three stators for example are arranged in line. Each stator is assigned a winding rod with a wire guide. The winding rods and wire guides arranged parallel to each other are also actively connected by a common stroke rod.

Figure 3:
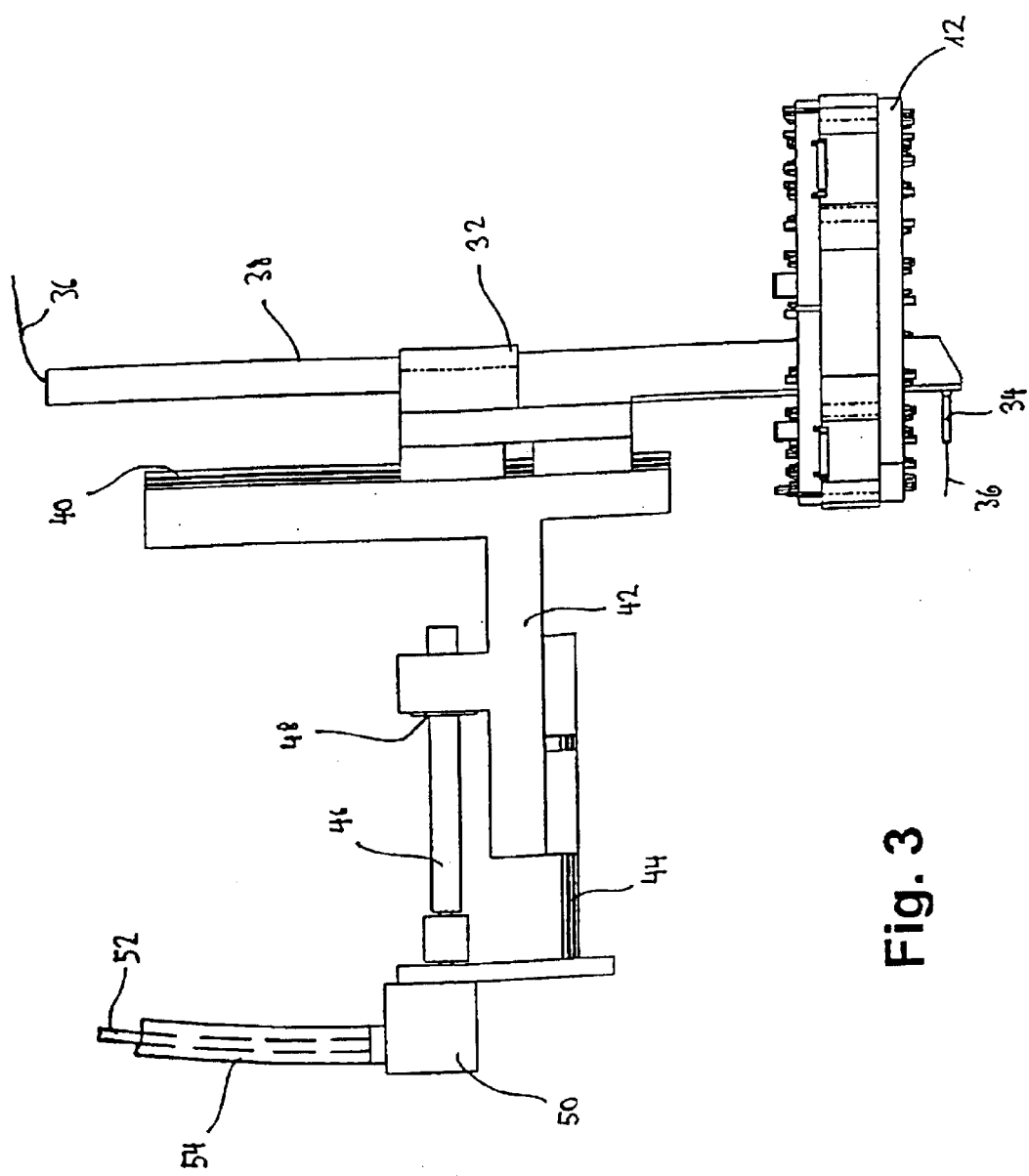
FIG. 3 an enlarged side view of an adjusting unit for a wire guide nozzle of FIG. 1
Figure 4:
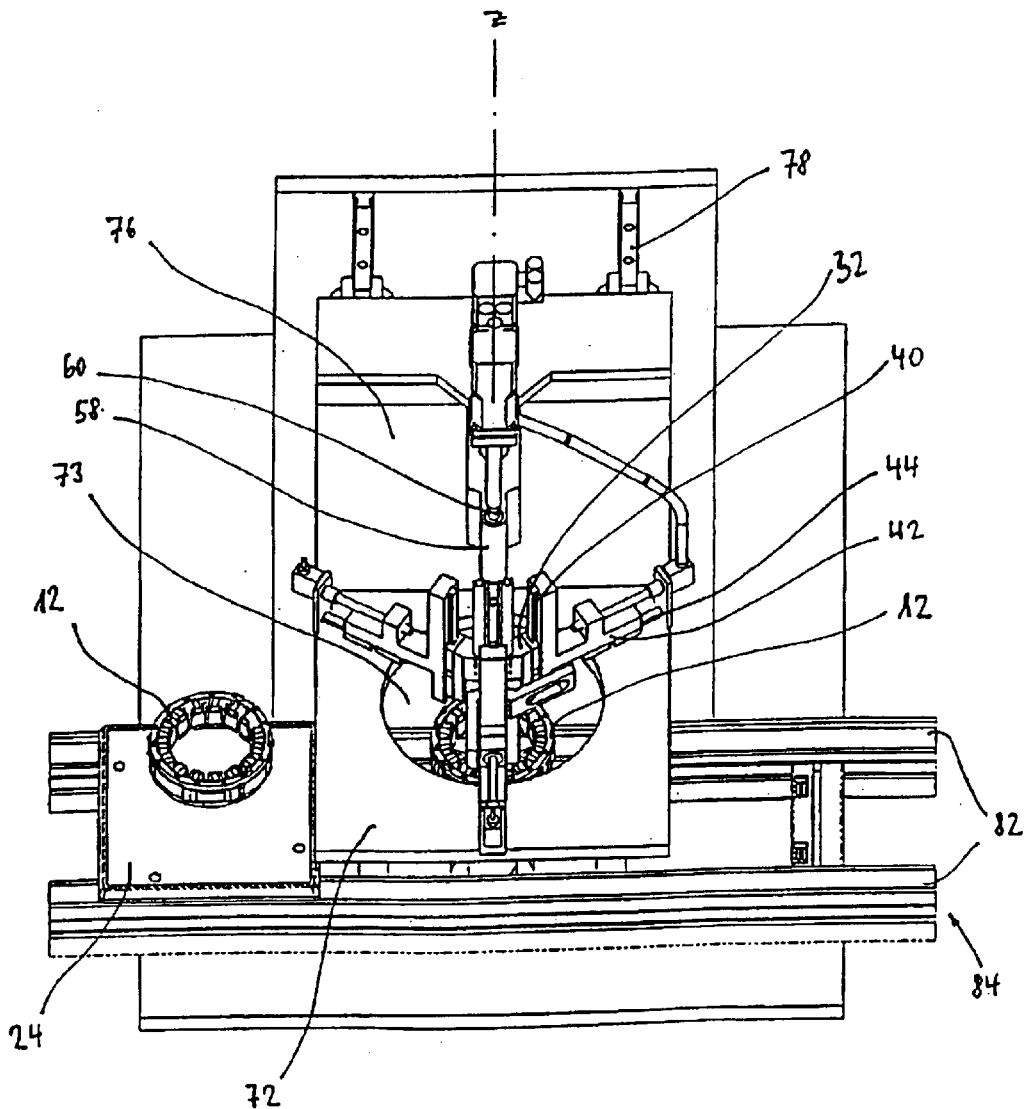
FIG. 4 a diagonal view of the winding machine of FIG. 1 with a pallet transport unit.

A winding machine for the simultaneous winding of one pole horn each of three stators is shown in FIG. 9 and comprises an in line and side by side arrangement of three identical adjusting units similar to the adjusting unit shown in FIG. 3. In the drawing the three units are arranged in a line perpendicular to the paper plane so that only one unit is visible in FIG. 9.

Each guide pin 70 attached to the winding rod 32 of each of the adjusting units is guided in the slot 68 of one of the three corresponding mounting pieces 66 adjoined to each of the adjusting units.

As shown in FIGS. 10 and 11, the three mounting pieces are rigidly attached to a common stroke rod 60 by means of three vertical struts 67 each connecting one of the three mounting pieces 66 to a common horizontal strut 69 fixed to the vertical stroke rod 60. The three mounting pieces 66 are arranged inline and side by side in a distance from each other corresponding to the distance of the winding rod 32 of the three adjusting units from each other.

What is claimed is:

1. Device for winding wire (36) around pole horns (16) of a rotationally symmetrical multipole stator (12) of an electrical machine, with a wire guide (34) for the supply of the wire (36) and for performing a winding movement made up of individual movements around the pole horn (16) to be wound and a traversing movement in the longitudinal direction of the pole horn (16), the improvement comprises:

means for performing a first traversing movement in a vertical direction (z), comprises a wire guide (34)

connected to a stroke rod (60) which is axially movable in the vertical direction (z), means for performing a second movement in a horizontal direction (y), comprises an indexing device (28) connected to a stator (12) to be wound, and means for performing a the traversing movement in a radial direction (x) corresponding to the longitudinal direction of the pole horn (16) to be wound, comprises the wire guide (34) connected to a winding rod (32) which is movable in the radial direction (x), wherein a mounting piece (66) with a slot (68) lying in the radial direction (x) is arranged on the stroke rod (60) and a guide pin (70) which is attached to the winding rod (32) is guided in the slot (68).

2. Device according to claim 1, wherein the winding rod (32) is movable in the radial direction (x) by means of a radial guide (44).

3. Device according to claim 2, wherein a first threaded spindle (46) is provided for the performance of the traversing movement.

4. Device according to claim 3, wherein the first threaded spindle (46) is connected with a first drive motor (56) by means of a flexible shaft (52).

5. Device according to claim 4, wherein the winding rod (32) is attached to an adjusting block (42) which is movable along the radial guide (44).

6. Device according to claim 5, wherein the winding rod (32) is movable in the vertical direction (z) along a vertical guide (40) arranged on the adjusting block (42), and the first threaded spindle (46) engages the adjusting block (42).

7. Device according to claim 1, wherein the stroke rod (60) is connected to a second drive motor (64) by means of a second threaded spindle (62).

8. Device according to claim 7, herein during the winding process the indexing device (28) is connected to a clamping device (22) for the stator (12) to be wound.

9. Device according to claim 8, wherein for the simultaneous winding of several pole horns (16) of a stator (12), several winding rods (32) are arranged each with a wire guide (34), the stroke rod (60) engages each of the winding rods (32) and the winding rods (32) can be moved synchronously by the first drive motor (52).

10. Device according to claim 8, wherein, for the simultaneous winding of one pole horn (16), each of several stators (12) and winding rods (32) are arranged each with a wire guide (34), the stroke rod (60) engages each of the winding rods (32) and the winding rods (32) can be moved synchronously by the first drive motor (52).

11. Device according to claim 10, wherein the winding rods (32) with the wire guide (34) are arranged parallel to one another and in line.

* * * * *